United States Patent
Brink et al.

[19]
[11] Patent Number: 6,148,986
[45] Date of Patent: Nov. 21, 2000

[54] IDLER ROLLER

[75] Inventors: Arend Jacobus Brink, Witbank, South Africa; Alan Habberley, Featherstone, United Kingdom

[73] Assignee: Flow Handling (Proprietary) Limited, Pretoria, South Africa

[21] Appl. No.: 09/147,644

[22] PCT Filed: Aug. 7, 1997

[86] PCT No.: PCT/GB97/02127

§ 371 Date: Aug. 9, 1999

§ 102(e) Date: Aug. 9, 1999

[87] PCT Pub. No.: WO98/06649

PCT Pub. Date: Feb. 19, 1998

[30] Foreign Application Priority Data

Aug. 8, 1996 [ZA] South Africa .......................... 96/6737

[51] Int. Cl.[7] .................................................. B65G 13/00
[52] U.S. Cl. ........................................................... 193/37
[58] Field of Search ..................................... 193/35 R, 37

[56] References Cited

U.S. PATENT DOCUMENTS

| | | | |
|---|---|---|---|
| 3,559,782 | 2/1971 | Lesley | 193/37 |
| 3,765,070 | 10/1973 | Stumpf | 193/37 |
| 4,344,218 | 8/1982 | Hooper et al. | 193/37 X |
| 4,681,215 | 7/1987 | Martin | 193/37 X |
| 5,025,917 | 6/1991 | Smith et al. | 198/842 |
| 5,642,800 | 7/1997 | East | 193/37 |

FOREIGN PATENT DOCUMENTS

| | | | |
|---|---|---|---|
| 59270 | 9/1982 | European Pat. Off. | 193/37 |
| 432311 | 6/1991 | European Pat. Off. | |
| 1016423 | 11/1952 | France. | |
| 6940449 | 4/1970 | Germany. | |
| 2089938 | 6/1982 | United Kingdom. | |

*Primary Examiner*—James R. Bidwell

[57] ABSTRACT

An end cap for an idler roller has a first component which is engageable with an idler shell, an inner cover and an outer cover. Two of these end caps are engaged with opposing ends of an idler shell to form an idler roller. The idler roller is assembled by engaging the two end caps with opposing ends of the idler shell, placing the assembly in an injection molding machine and injection molding a plastic coating over at least the shell.

10 Claims, 4 Drawing Sheets

IDLER ROLLER

FIELD OF THE INVENTION

This invention relates to an idler roller, a method of constructing an idler roller and to an end cap for an idler roller.

SUMMARY OF THE INVENTION

According to the invention there is provided an idler roller comprising an idler shell, a stub axle at each end of the idler shell and at least one bearing located on each stub axle rotatably supporting the idler shell.

In a further aspect of the invention there is provided an idler roller, comprising an end cap at each end of the idler shell, each of said end caps having a first component which is engageable with the idler shell, an inner cover and an outer cover for the first component, an inwardly extending stub axle made integral with the outer cover, an outwardly extending mounting pin also integral with the outer cover, and at least one bearing mounted on the stub axle rotatably supporting the first component.

Preferably, this invention relates to an end cap for an idler roller which is moulded from a polymer material.

The polymer material may be of any appropriate kind and a suitable material is glass-filled nylon.

The end cap may include two or more components. In one embodiment of the invention the end cap includes a first component which is engageable with an idler shell, an inner cover and an outer cover.

The inner cover and the first component may form a seal of any appropriate kind. Similarly the outer cover and the first component may form a seal of any appropriate kind. In each case the seal may comprise a labyrinth seal, a spiral seal or, if necessary, a lip seal.

The spiral seal may include a tongue formation which spirals outwardly from a central position, in a direction which, due to rotation of the end cap which occurs in use, assists in directing a particle contained in the spiral radially outwardly and hence away from the end cap. The tongue formation may be in a stationary part, but preferably is in a rotating part, of the end cap.

The labyrinth seals may be formed by means of interengaging tongue and groove formations.

The tongue and groove formations may be moulded directly into the first component and into the inner and outer covers.

The outer cover may include a mounting pin which may be notched or formed with flats or any other formations to anchor the mounting pin to a suitable support. The mounting pin and stub axle may be co-axial.

The outer cover may include an inwardly extending stub axle on which one or more bearings are mounted and which receive the first component.

If two bearings are used then these are preferably spaced from one another along the inner stub axle to provide a balanced support structure. Alternatively a double bearing may be used to provide a similar function.

The first component may have an outer rim which is engageable with the idler shell, preferably with friction fit, an inner hub in which the bearing or bearings are located, and ribs between the hub and the rum which deform in a controlled manner, when the rim is radially compressed, to maintain the rim centrally and symmetrically positioned relatively to the hub. The ribs may be of any appropriate shape or orientation and may for example be sinuous or V-shaped, or have one or more hollow formations.

The invention also extends to an idler roller which includes a shell and two end caps, each of the aforementioned kind, engaged with opposing ends of the shell.

The shell may be covered with an injection moulded plastics coating of any appropriate kind which is corrosion and wear resistant. The shell may for example be made from metal or plastic.

The shell may contain longitudinal stiffening ribs on it s inside.

The invention further extends to a method of assembling an idler roller which includes the steps of engaging two end caps having stub axles with opposing respective ends of an idler shell, placing the assembly in an injection moulding machine, and injection moulding a plastic coating over at least the shell.

The invention also provides an idler roller which includes a shell, end caps engaged with opposed ends of the shell, and a plastic coating which is injection moulded directly over at least the shell.

BRIEF DESCRIPTION OF THE DRAWINGS

Preferred embodiments of the invention are described below by way of example, with reference to the accompanying drawings.

DETAILED DESCRIPTION OF THE DRAWINGS

Figure 1:
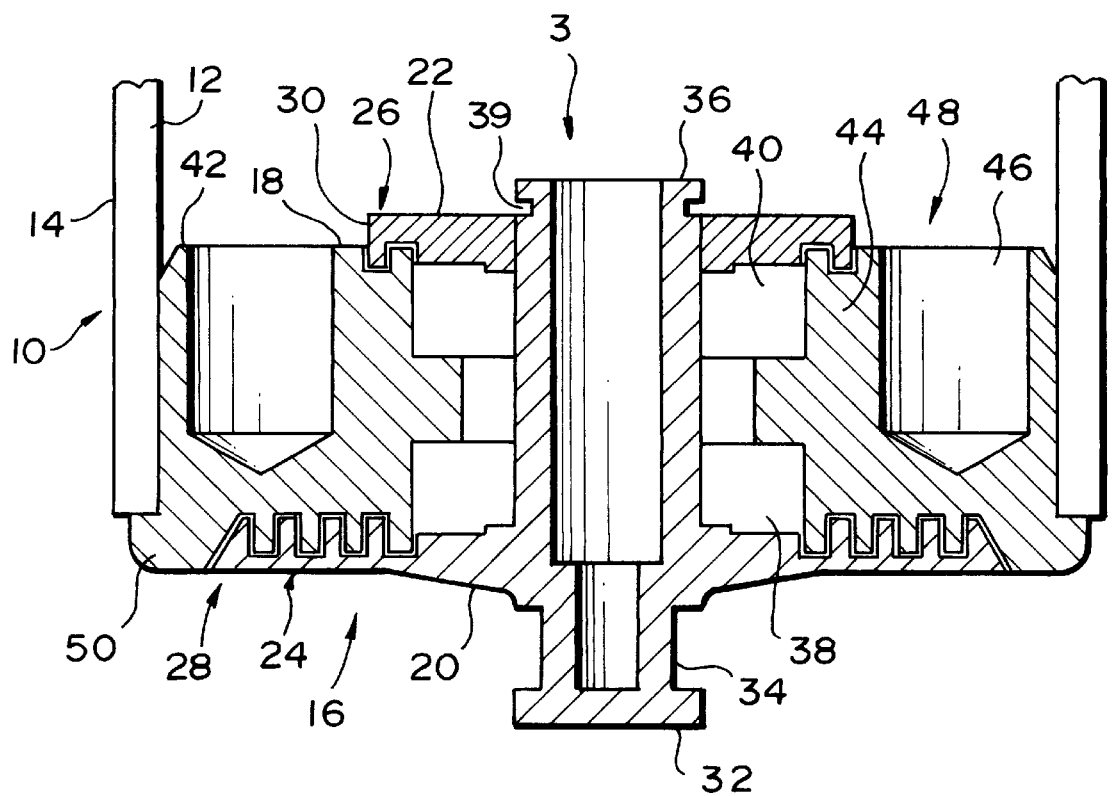
FIG. 1 is a side view in section of an end of an idler roller according to one form of the invention.

FIG. 1 of the accompanying drawings illustrates an end of an idler roller (10) according to the invention which includes a shell (12), plastic coating (14) over the shell and, at opposite ends of the shell (12), two end caps (16). Only one end cap is illustrated in the drawing.

Each end cap includes a first component (18) which is directly engaged with the shell (12), an outer cover (20) and an inner cover (22).

The first component (18), the outer cover (20) and the inner cover (22) are each moulded from a suitable polymer material such as glass-filled nylon.

Figure 5:
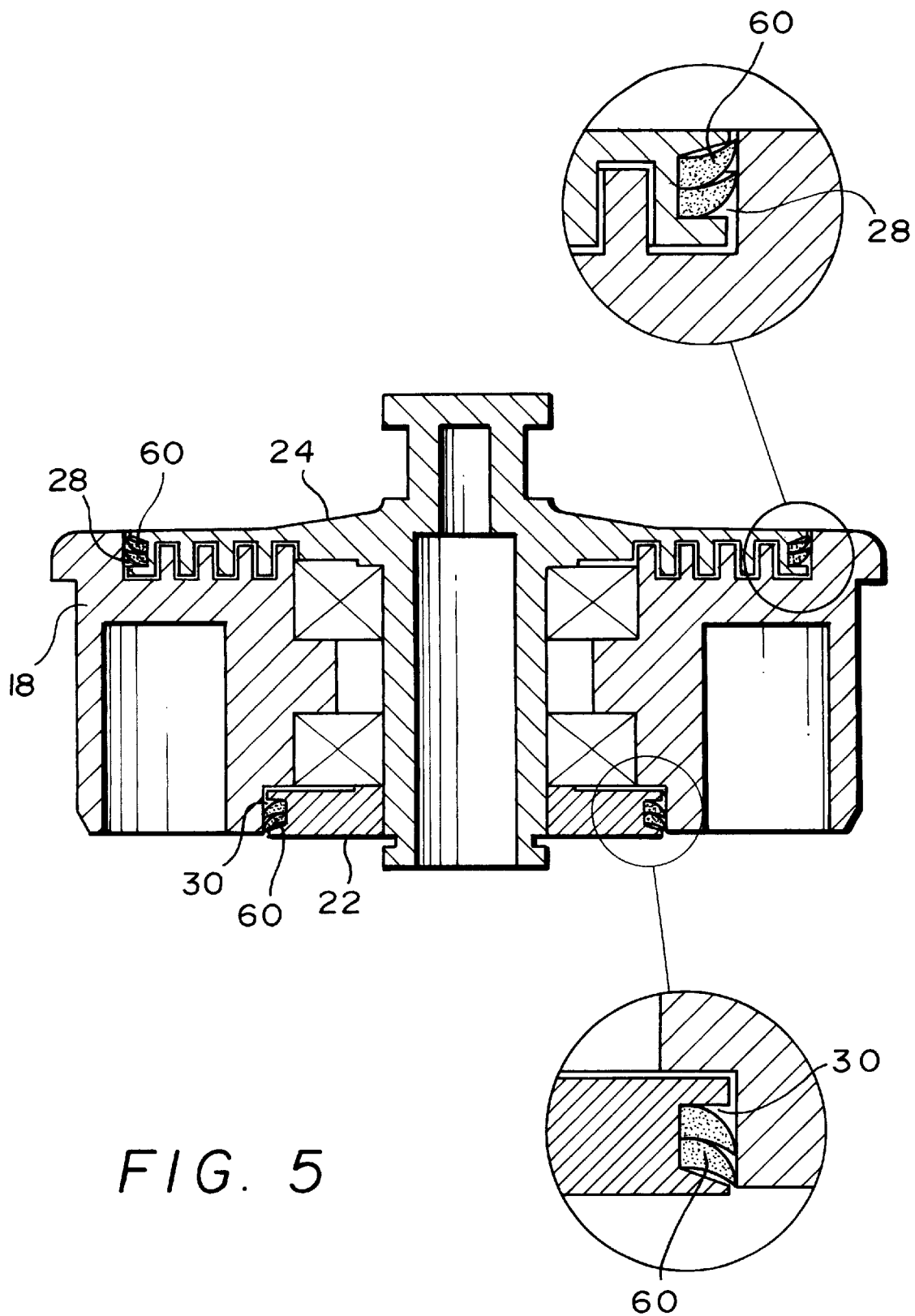
FIG. 5 is a side view of the idler roller as shown in FIG. 1 but with certain modifications made thereto.

The first component (18), and outer cover (20) are formed with interengaging circular tongue and groove formations (24) which define an integral moulded labyrinth seal. Similarly the first component (18) and the inner cover (22) are formed with tongue and groove formations (26) which form an inner labyrinth seal. If necessary, although this will be at the increase of frictional wear and drag a lip seal (60) as shown in FIG. 5 could be formed across an exposed gap (28) between the component (18) and the end cap (24), or across an exposed gap (30) between the first component (18) and the inner cover (22).

The outer cover (20) is formed with an outwardly extending pin (32) which has flats (34), more clearly shown in FIG.

2, to facilitate its non-rotational engagement with an appropriate support structure, not shown.

An inwardly extending stub axle (36), which is integral with the outer cover, extends through the first component (18). The outwardly extending pin (32) and stub axle (36) are co-axial with each other. Two bearings (38) and (40) are mounted on the stub axle (36) and provide rotational support for the first component (18). The inner cover (22) is kept in position by means of a circlip, not shown, which is engaged with a groove (39) in the stub axle, adjacent an outer side of the inner cover (22).

The shell (12) is initially engaged with two of the end caps (16) and thereafter the shell and end caps are placed in an injection moulding machine, not shown. The plastic coating (14), of a suitable wear and corrosion resistant material, is then directly injection moulded at least over the shell (12) in conventional manner. Provided the end caps are correctly and centrally positioned the coating (14) is symmetrically formed on the shell (12) and no further finishing or machining of the coating is required.

Figure 2:
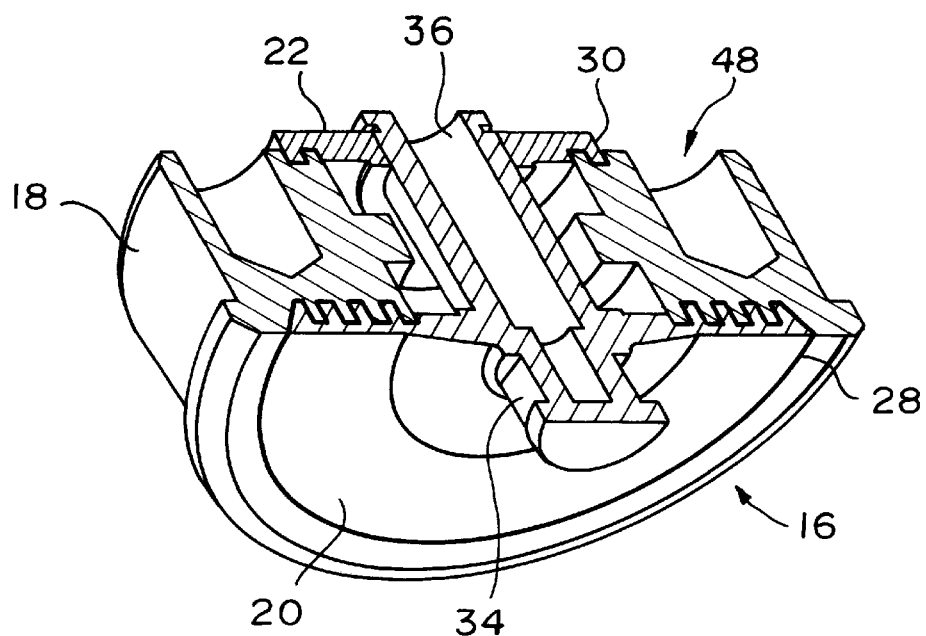
FIG. 2 is a perspective view, again sectioned, of an end cap shown in FIG. 1.

It is to be noted that the injection moulding technique described hereinbefore does not necessarily require end caps of the kind shown in FIGS. 1 and 2 in order to be implemented. Thus the scope of the invention in this respect is not confined in any way.

The use of the end caps shown in FIGS. 1 and 2 means that an idler roller can be constructed from fewer parts. This lowers costs and facilitates assembly. The moulded polymer parts have the following advantages when compared to an end cap which is fabricated from steel; there is greater design freedom; the parts are moulded exactly to the required size and no further finishing is required; the accurate moulding results in good tolerance and quality control and produces a free running precision idler roller; the idler roller has good corrosion resistance; there is no need for painting or any other finishing once the end caps are engaged with the shell subject of course to the optional coating (14) being applied to the shell; the bearings (38) and (40) are precisely supported; the seals which are provided by the labyrinth formations are automatically formed and this results in longer idler roller life; where use is made of two spaced bearings a cantilever type support is provided which reduces stresses; and there is a substantial saving in weight which makes installation easier and reduces transport costs.

Another benefit is that it is not necessary to have a shaft extending through the shell of an idler roller which incorporates end caps of the kind described. The stub axles protruding from the end caps are all that is necessary to support the idler roller adequately. The elimination of the shaft saves weight, facilitates manufacture and assists in providing a more effective seal for the bearings.

The first component (18) includes an outer rim (42) which is engaged with an interference fit directly with an inner surface of the shell (12), and an inner hub (44) in which the bearings (38) and (40) are located. As shown more clearly in FIG. 3 a number of ribs (46) extend in a general radial direction from the hub (44) and connect the hub (44) to the rim (42). Hollow formations (48), between the ribs, face the interior of the shell. A section (50) of the first component (18), on an opposing side interconnects the ribs (46). The tongue and groove formations, which make up the labyrinth seal (24), are formed in this section (50).

Figure 3:
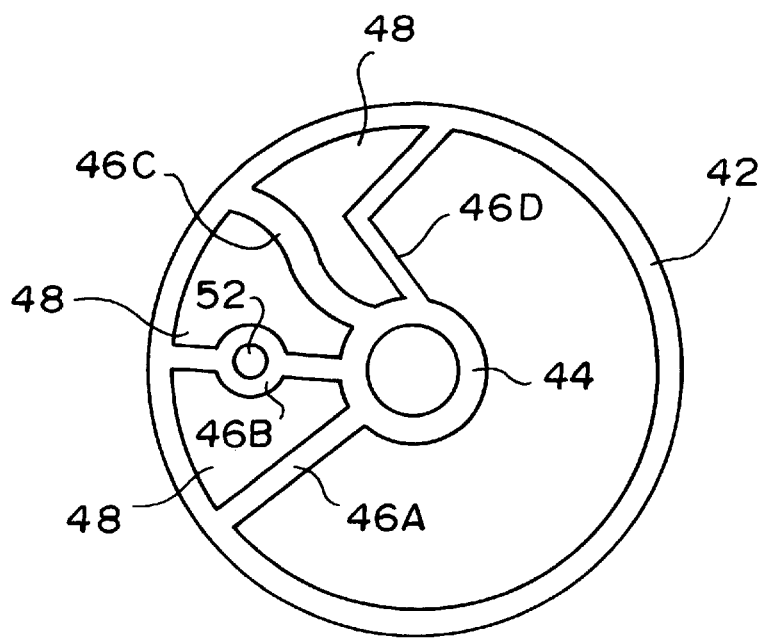
FIG. 3 is a schematic view of an inner side of an end cap with different rib supports.

FIG. 3 is a somewhat schematic end view of the end cap, in the direction marked "3" shown in FIG. 1. This figure depicts different types of ribs (46A), (46B), (46C) and (46D) between the hub and the rim.

The tolerances of the inner diameter of the shell (12) and the outer diameter of the rim (42) must be such that the rim is frictionally retained in position when it is inserted into the shell. These components are therefore made under precision conditions but, nonetheless, it is possible for the rim (42) to be oversized relatively to the inner surface of the shell. When the rim is pressed into position it is radially compressed and radial deformation of the end cap takes place.

It has been found that a rib (46A) of the kind shown in FIG. 3 does not necessarily reform symmetrically with the result that the stub axle may be position off-centre relatively to the shell. It is desirable, in this regard, for the ribs to have a shape which permits symmetrical radial deformation under the conditions described.

The ribs (46) may therefore be of the kind (46B), (46C) or (46D) shown in FIG. 3, or any equivalent shape which permits radial deformation. Tests have shown that the rib (46C) may be the preferred option.

The rib (46B) includes a central hollow formation (52) which provides a volume which is capable of absorbing radial deformation in a symmetrical manner. The ribs (46C) and (46D) on the other hand deflect evenly when loaded in the radial direction. The type of rib which is chosen, its dimensions and the number of ribs between the hub and the rim are chosen taking into account, inter alia, the need for a firm frictional engagement between the rim (42) and the shell (12) and the ability of the end cap to deform symmetrically radially if an oversized condition should arise.

Figure 4:
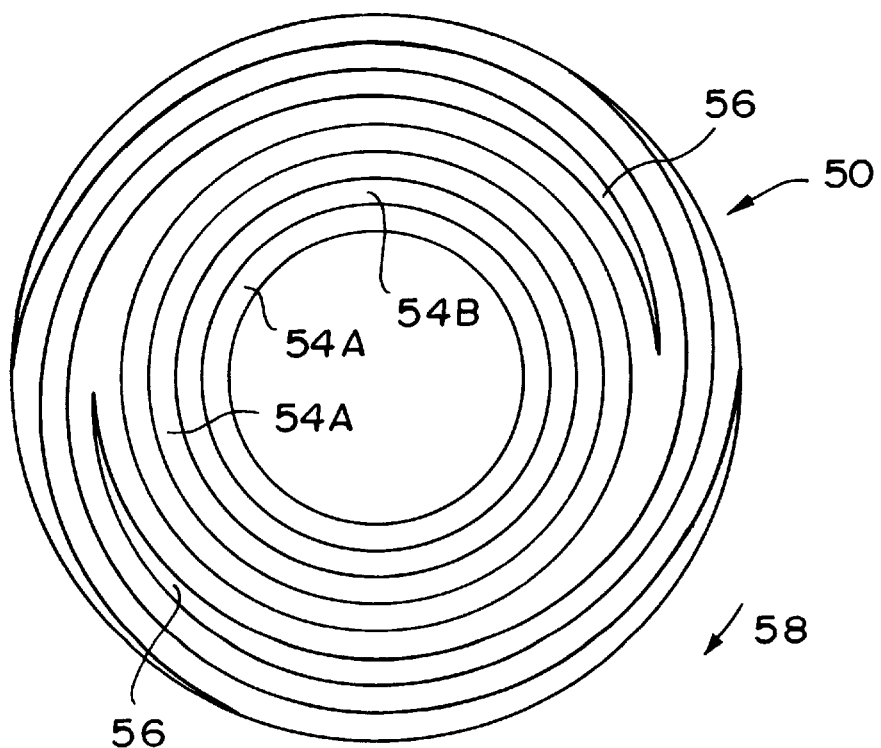
FIG. 4 illustrates a spiral seal which can be included in the end cap of the invention.

FIG. 4 is a side view of the section (50) and illustrates a modified form of sealing arrangement for use in the end cap. In this case use is made of a labyrinth seal which is not as extensive as in the labyrinth seal (24) shown in FIG. 1 but which is formed in an analogous manner by means of interengaging tongue and groove formations (54A) and (54B) respectively. Outwardly extending radial tongue formations (56) are located in a corresponding groove formation (not shown) in the outer cover (20). The tongue formation (56) spiral outwardly from the labyrinth seal in a direction which is related to the direction of rotation of the roller. Thus, viewed from the side, if the roller rotates in a first direction (58) about its axis then the tongue formations (56) move radially away from the axis as rotation takes place. This has the effect that any dirt particle which comes into contact with either tongue formation is moved outwardly by centrifugal force as the roller rotates and is urged towards the gap (28). This assists in keeping foreign material from reaching the bearings (38) and (40).

A similar radial seal can be provided, if necessary, between the first component (18) and the inner cover (22).

Figure 6:
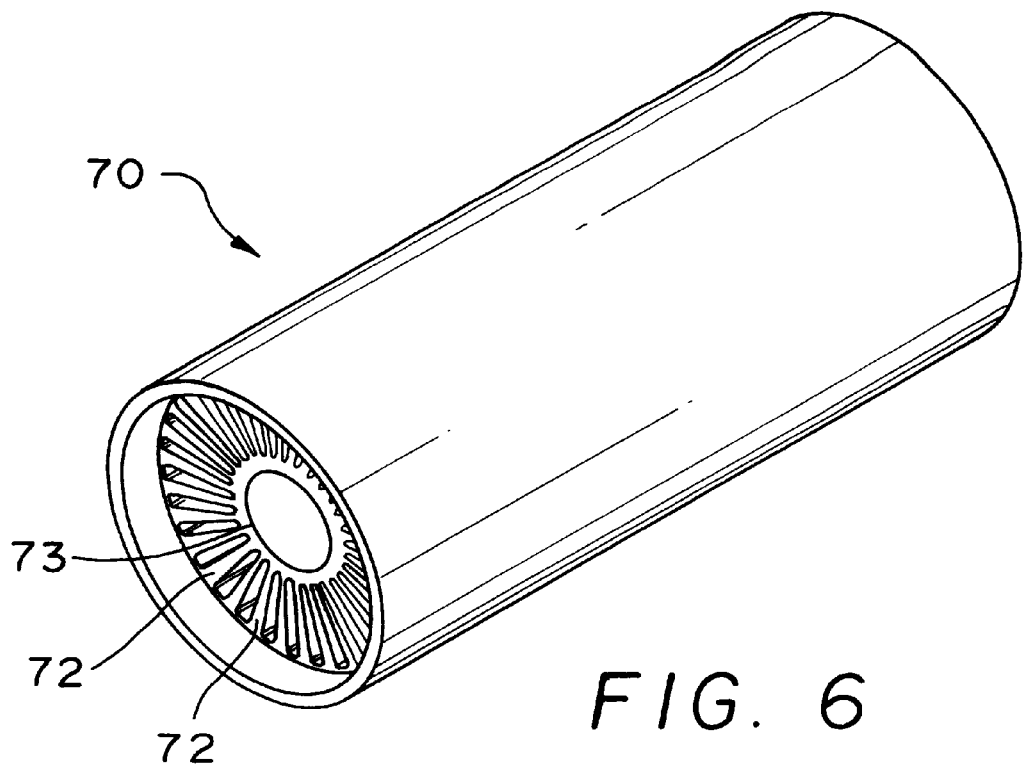
FIGS. 6 and 7 are cross sectional views of alternative embodiments of a shell for the idler roller.
Figure 7:
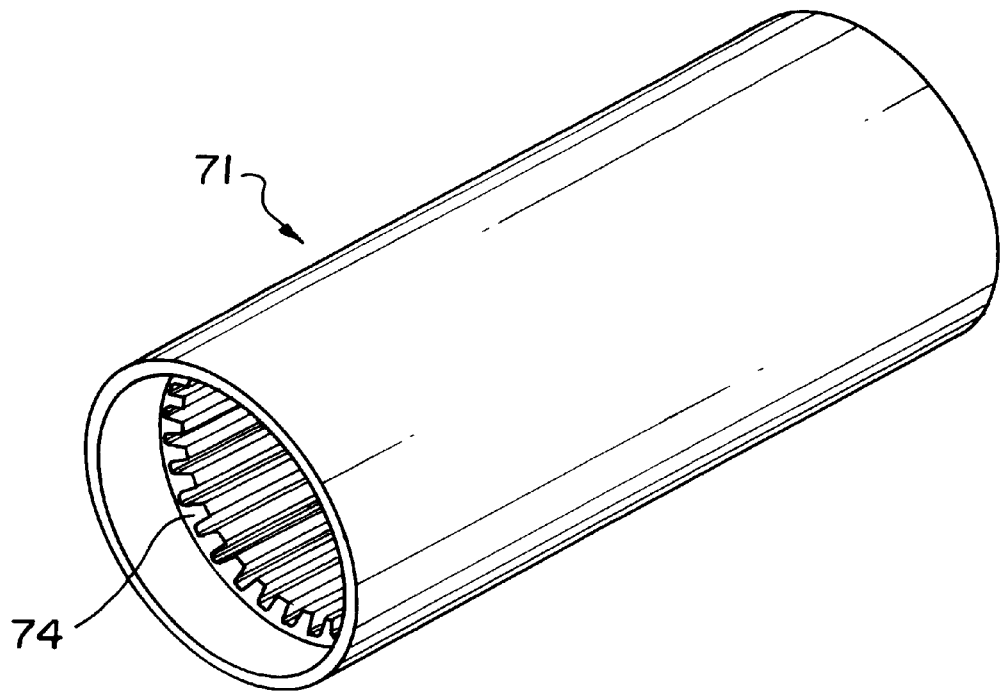

In FIGS. 6 and 7 are shown cross sectional views of alternative shells (70) and (71). The shall (70) is made from a plastics materials and has a number of equally spaced longitudinal stiffening ribs (72) on its inside. At their innermost ends the ribs (72) end in a co-axial tube (73). The ribs (74) of the embodiment shown in FIG. 7 extend only a small distance toward the centre of the shell and are not interconnected at this innermost ends. These shells are more rigid and reduce the amount of material required.

What is claimed is:

1. An idler roller, which includes an idler shell and two end caps which are respectively located at opposed ends of the idler shell, each end cap including a first component which is engaged with the idler shell, a pin which projects from the shell and which is shaped for non-rotating support in a supporting cradle, a stub axle which extends into the shell, and at least two bearings mounted on the stub axle and rotatably supporting the first component, wherein each end cap includes a respective outer cover which is integral with the respective pin and means forming a seal between the outer cover and the first component.

2. An idler roller according to claim 1 wherein, in each end cap, the first component has an outer rim which is engaged with an inner surface of the shell, and an inner hub in which the said bearings are located.

3. An idler roller according to claim 2 wherein each end cap includes ribs between the inner hub and the outer rim which deform in a controlled manner, when the outer rim is radially compressed, to maintain the outer rim centrally and symmetrically positioned relatively to the hub.

4. An idler roller according to claim 2 wherein each outer rim is engageable by means of a friction fit with the idler shell.

5. An idler roller according to claim 1 wherein, in each end cap, the stub axle and the pin are formed integrally and co-axially with each other.

6. An idler roller according to claim 1 which includes, for each end cap, a respective inner cover which is mounted to the respective stub axle and means forming a seal between the inner cover and the respective first component.

7. An idler roller according to claim 1 wherein the shell is covered with an injection moulded plastics coating which is corrosion and wear resistant.

8. An idler roller according to claim 1 wherein the shell contains stiffening ribs on its inside.

9. An end cap for an idler roller which includes a first component with an outer rim and an inner hub, a pin and a stub axle which are integrally formed with each other, the stub axle being located inside the inner hub, and two bearings located inside the inner hub and mounted on the stub axle, whereby the first component is rotatable around the stub axle.

10. An idler roller which includes an idler shell and two end caps which are respectively located at opposed ends of the idler shell, each end cap being according to claim 9, the stub axles being in line with each other, without an intermediate shaft between the stub axles, whereby the idler shell is rotatable, together with the said first components, about the stub axles.

* * * * *